United States Patent
Martin et al.

(10) Patent No.: US 6,554,579 B2
(45) Date of Patent: Apr. 29, 2003

(54) LIQUID DISPENSING SYSTEM WITH ENHANCED FILTER

(75) Inventors: Carl A. Martin, Fremont, CA (US); Vernon H. Foersterling, Coppell, TX (US); Darko Hadzidedic, Dallas, TX (US); Raymond T. Savard, Pilot Point, TX (US); Gary Minor, Lewisville, CA (US)

(73) Assignee: Integrated Designs, L.P., Carrollton, TX (US)

( * ) Notice: Subject to any disclaimer, the term of this patent is extended or adjusted under 35 U.S.C. 154(b) by 0 days.

(21) Appl. No.: 10/112,661

(22) Filed: Mar. 28, 2002

(65) Prior Publication Data

US 2002/0158079 A1 Oct. 31, 2002

Related U.S. Application Data

(60) Provisional application No. 60/279,980, filed on Mar. 29, 2001.

(51) Int. Cl.$^7$ ................................................ F04B 53/00
(52) U.S. Cl. ............................. 417/53; 417/313; 222/1; 222/189.06
(58) Field of Search ................................. 417/513, 313; 222/1, 64, 139.06, 139.09, 319; 210/406

(56) References Cited

U.S. PATENT DOCUMENTS

| | | | |
|---|---|---|---|
| 4,483,665 A | 11/1984 | Hauser | |
| 4,950,134 A | 8/1990 | Bailey et al. | |
| 5,096,598 A | * 3/1992 | Pecen et al. | ................. 210/741 |
| 5,167,837 A | 12/1992 | Snodgrass et al. | |
| 5,316,181 A | * 5/1994 | Burch | ......................... 222/61 |
| 5,490,765 A | 2/1996 | Bailey et al. | |
| 5,516,429 A | 5/1996 | Snodgrass et al. | |
| 5,527,161 A | 6/1996 | Bailey et al. | |
| 5,537,911 A | * 7/1996 | Ohlrogge et al. | ............... 95/22 |
| 5,762,795 A | 6/1998 | Bailey et al. | |
| 5,772,899 A | 6/1998 | Snodgrass et al. | |
| 5,899,667 A | 5/1999 | Greer | |
| 6,238,576 B1 | 5/2001 | Yajima | |

* cited by examiner

*Primary Examiner*—Charles G. Freay
(74) *Attorney, Agent, or Firm*—Marc A. Hubbard; Munsch Hardt Kopf & Harr, P.C.

(57) ABSTRACT

A system and method for reducing the time for charging a filter in a liquid dispensing system, such as one utilizing a positive displacement pump, is disclosed. The filter is located at the input side of the pump between the source of the liquid and the pump. In order to prevent air from the filter from entering the pump a reservoir is provided between the filter and the source of the fluid. Air from the filter is vented into the reservoir through a vent tube. A vacuum is used to draw air from the filter and, through the reservoir.

24 Claims, 7 Drawing Sheets

LIQUID DISPENSING SYSTEM WITH ENHANCED FILTER

RELATED APPLICATION

The present application claims priority to provisional application Serial No. 60/279,980, filed on Mar. 29, 2001, entitled "System and Method for Dispensing Fluids in a Positive Displacement Pump."

TECHNICAL FIELD OF THE INVENTION

The present invention relates generally to the field of liquid dispensing system and in particular to a system and method for efficiently charging a filter of a liquid dispensing system.

BACKGROUND OF THE INVENTION

Many processes require accurate control over the amount and/or rate at which a fluid is dispensed by pumping apparatus. Both the rate and amount of processing fluid applied to, for example, a semiconductor wafer during fabrication of integrated circuits are very accurately controlled to ensure that the processing liquid is applied uniformly and to avoid waste and unnecessary consumption.

Fluid dispense systems in the prior art normally use positive displacement pumps to provide accurate metering of fluid. One type of positive displacement pump sometimes used in the prior art is a bellows-type pump, an example of which is disclosed in U.S. Pat. No. 4,483,665. In a typical bellows pump, fluid to be pumped enters a hollow tubular bellows through a one-way check valve. Usually, the discharge end of the bellows is constrained from movement, while the other end is connected to a reciprocating mechanical member that selectively works the bellows for longitudinal expansion and contraction. When contracted, fluid is expelled or pumped from the bellows under pressure. One problem with a bellows pump is that the pleats or convolutions in the bellows make it difficult to purge completely air or chemicals from the bellows. Air remaining in the bellows can create undesirable air bubbles.

A diaphragm-type positive displacement pump overcomes some of the problems associated with a bellows type of pump. A diaphragm pump has a diaphragm that divides a pumping chamber into two sections. A working fluid is pumped into and out of one section of the chamber to cause the diaphragm to move back and forth, thereby forcing process fluid to be drawn into and pushed out of the other half of the chamber. If the change in the volume of the working fluid within the chamber is accurately known, the volume of the process fluid within the chamber can also be known accurately, thus allowing for accurate metering. Diaphragm pumps are therefore often actuated by incompressible hydraulic fluid to achieve very accurate control over movement of the diaphragm. Examples of diaphragm pumps are disclosed in U.S. Pat. Nos. 4,950,134, 5,167,837, 5,490,765, 5,516,429, 5,527,161, 5,762,795, and 5,772,899.

Another type of well known positive displacement pump is a rolling membrane pump. A rolling membrane pump includes a reciprocating piston that displaces fluid within a pumping chamber. Unlike piston-type pumps that have a moving seal between the piston and the pumping chamber walls, a flexible membrane is attached to the piston and to the side walls of the chamber to prevent fluid from escaping between the walls and the piston. As the piston moves, the membrane rolls up and down the side of the pump.

These types of dispensing systems are being used, for example, in the manufacture of multi-chip modules (MCM), high-density interconnect (HDI) components and other semiconductor materials requiring the application of a thin layer of polyamide material as an inner layer dielectric. In addition to the unique mechanical and electrical properties that make polyamides ideally suited for use in the manufacture of semiconductors, polyamides also have physical properties that make it difficult to pump or supply the polyamides in exact amounts. Specifically, polyamides are viscous; most polyamides used in the manufacture of semiconductors have viscosities in excess of 400 poise. Fluids with viscosities this high are difficult to pump and difficult to filter. To be useful in a "cleanroom" environment the fluids must be filtered. Contamination in semiconductor device fabrication processes lowers yields and results in lost process fluid and production time. By its nature the filter becomes clogged during use. In positive displacement pumps, such as diaphragm-type positive displacement pumps, fluid flow rate through the filter decreases as the filter becomes more clogged, making it even more difficult to achieve repeatable, accurate dispense of fluid. Thus, the filter has to be changed periodically. One of the problems encountered in certain manufacturing processes such as those dispensing liquid photoresist chemicals is discontinuities formed in photoresist layers due to air bubbles that are introduced into the process. After the filter is changed, the system must be filled with fluid and air must be removed or purged, in order to prevent air bubbles from forming in the fluid. Positive displacement type pumps used to dispense fluid are also used to draw fluid into the system. Fully charging the system takes a long time, typically upwards of thirty minutes. This process causes a lot of down time during which the dispensing system cannot be used. However, since purging the air from the filter is an important step to avoid bubbles in the fabrication process, the purging process cannot be short circuited or eliminated.

SUMMARY OF THE INVENTION

The invention relates to an improved liquid dispensing system in which the time to purge air from the system and to charge a filter, especially after a filter change, is substantially reduced, thus reducing the down time of the system.

In a preferred embodiment of a liquid dispensing system employing the teachings of the present invention, a reservoir and filter are in line between a liquid source and a positive displacement pump, so that liquid flows from the source, into the reservoir and then into the filter. The filter is also vented through the reservoir. To charge the filter, a vacuum from a constant vacuum source such as Venturi is applied to the reservoir. This causes air to be drawn out of the filter and the reservoir, and liquid to be drawn into reservoir from a source. This results in the filter being purged of air and charged with liquid much faster than using only the positive displacement pump. Furthermore, venting the filter through the reservoir rather than the positive displacement pump reduces the opportunity for from the filter to enter the pump air from the filter. By having the filter at the input side of the pump and not in the dispense path, the accuracy and repeatability of the pump is also improved. Moreover, the dispense path and the suckback path of the positive displacement pump is direct and a filter valve is not necessary in the dispense path.

Other aspects and features of the invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 4 of the drawings, like numerals being used for like and corresponding parts of the various drawings.

Figure 1:
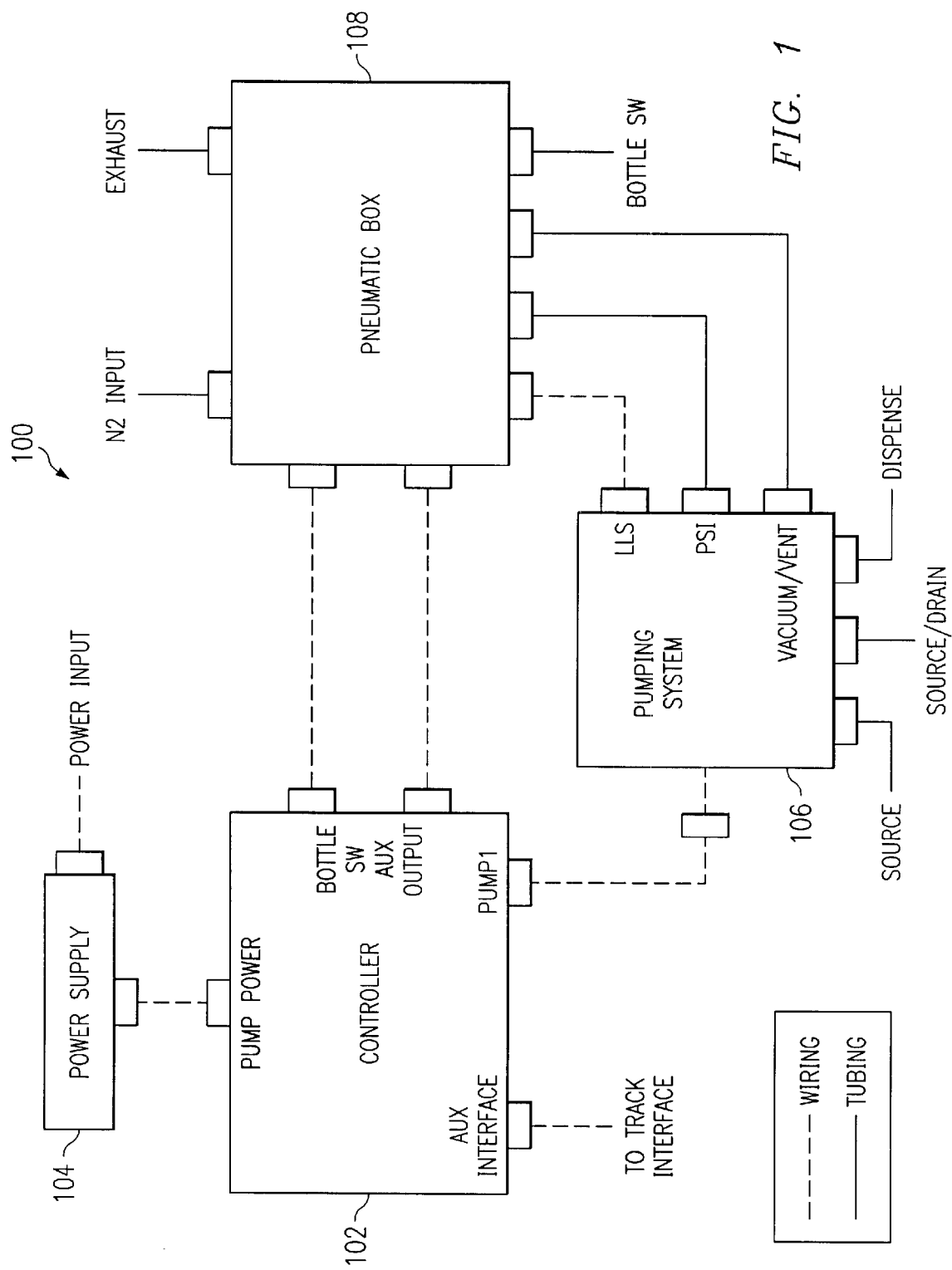
FIG. 1 is a block diagram of a preferred embodiment of the liquid dispensing system incorporating teachings of the present invention.

Referring to FIG. 1, liquid dispensing system 100 is a representative example of a liquid dispensing system of the type used in semiconductor fabrication processes for dispensing accurate and repeatable amounts, with which the invention may be used. Such a system can be made to be compatible with different types of acids, solvents and bases. Representative system 100 includes a software driven controller 102. Controller 102 is coupled to a power supply unit 104, which supplies power to system 100. Pumping system 106 is shown coupled to controller 102. The controller could control multiple pumping systems. The pumping system may include more than one pump, and the controller could be used to control multiple pumping systems. A pneumatic box 108 supplies to pumping system 106 a pressuring gas, preferably an inert gas such as nitrogen, and a vacuum. The use of the pressuring gas and vacuum are described below. Controller 102 is used to control operations of pneumatic supply or box 108 according to a software-controlled process—for example to start and stop operation of a vacuum Venturi and to turn on and off supply of pressuring gas.

Figure 2A:
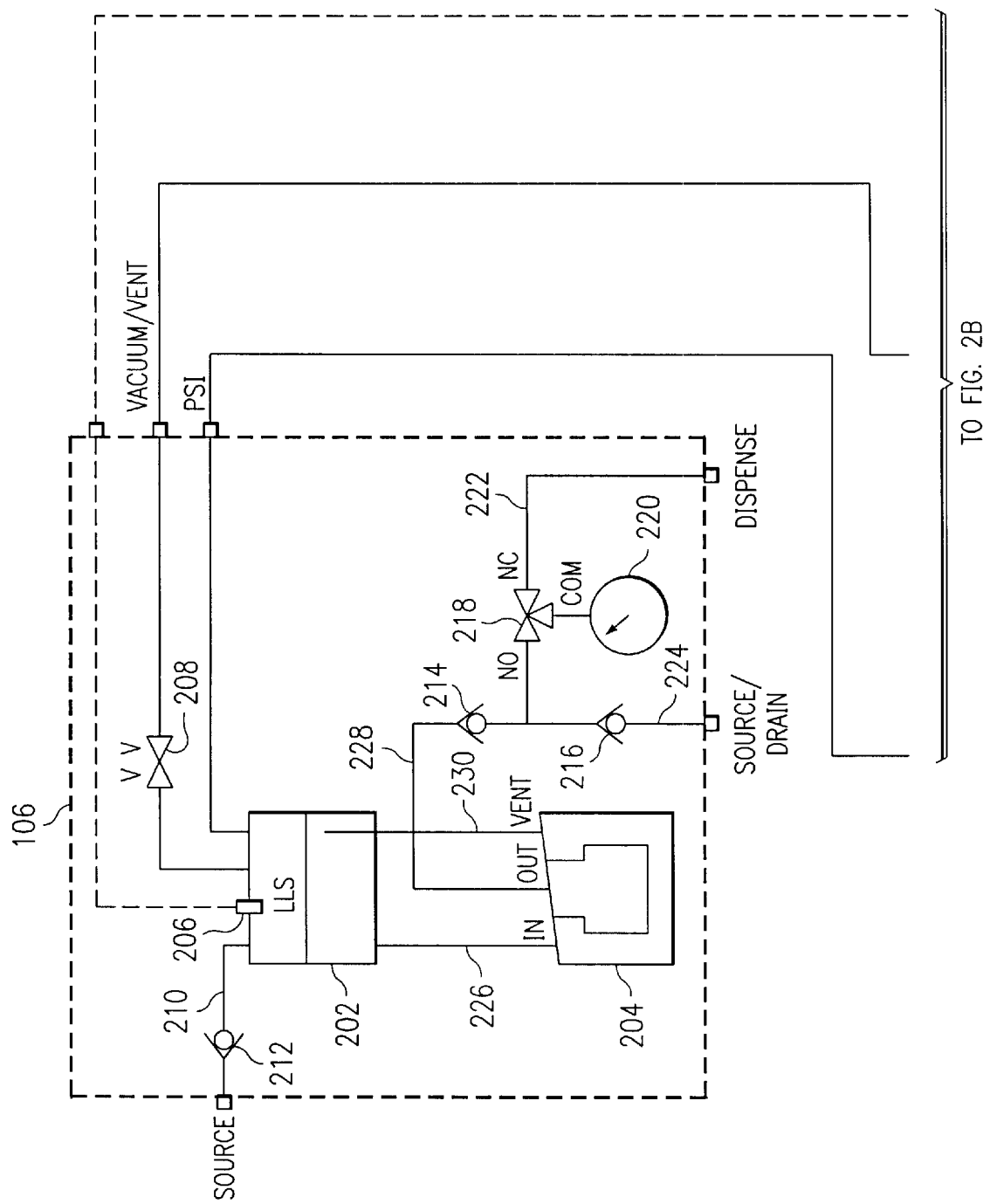
FIGS. 2A & 2B is a schematic view of part of the preferred embodiment liquid dispensing system of FIG. 1.
Figure 2B:
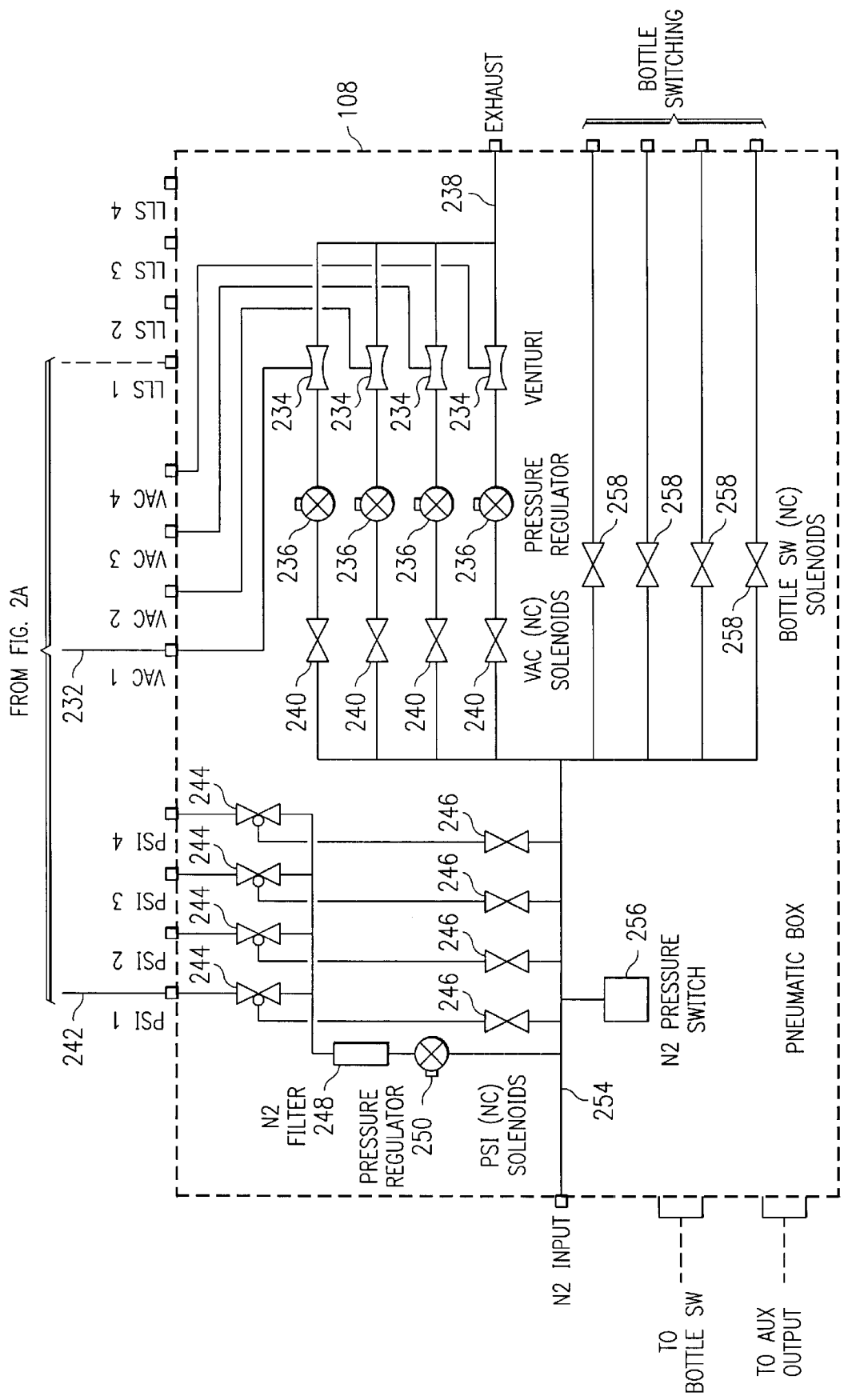
Figure 3A:
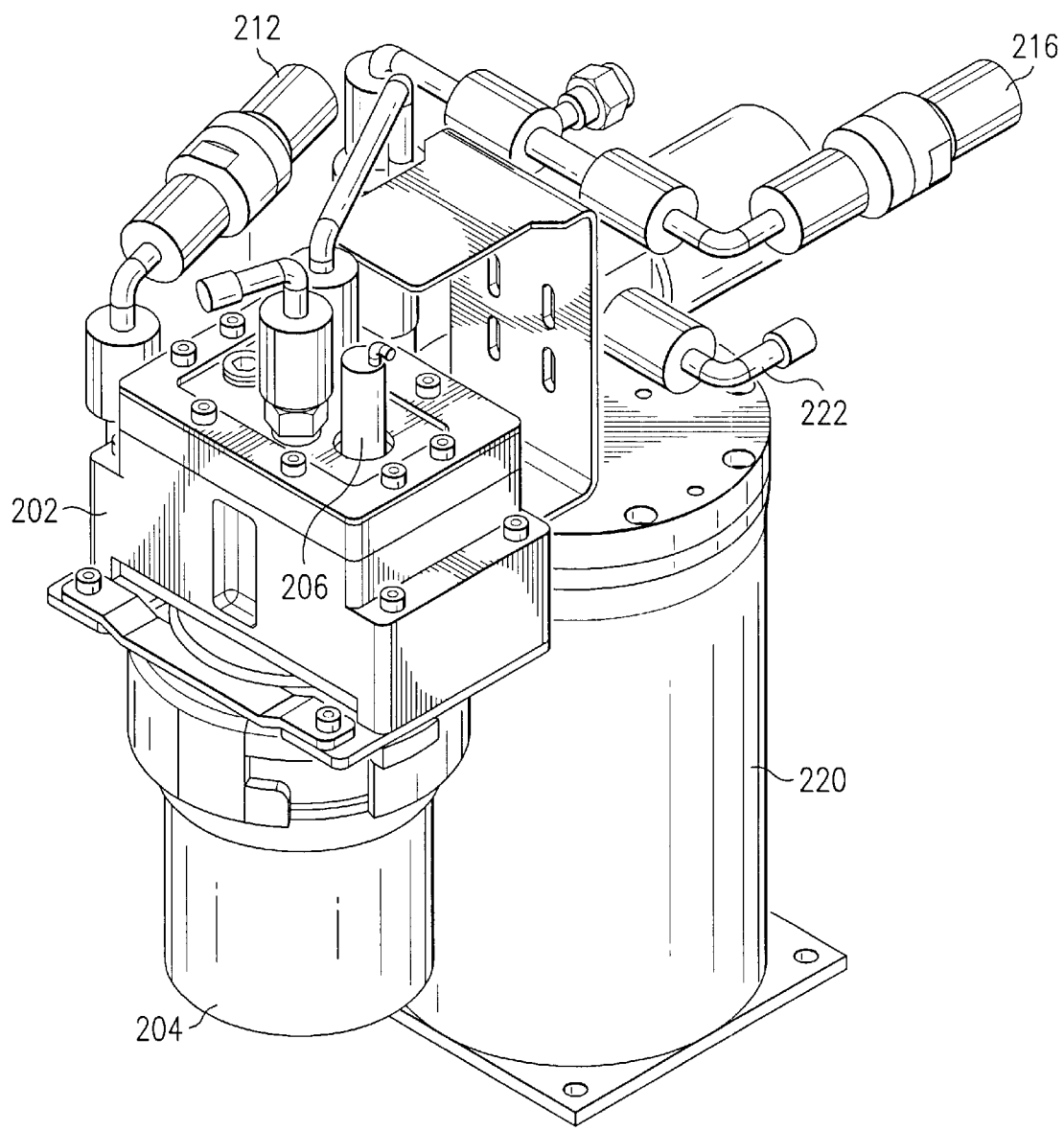
FIG. 3A is a pictorial view of the preferred embodiment liquid dispensing system of FIG. 2.
Figure 3B:
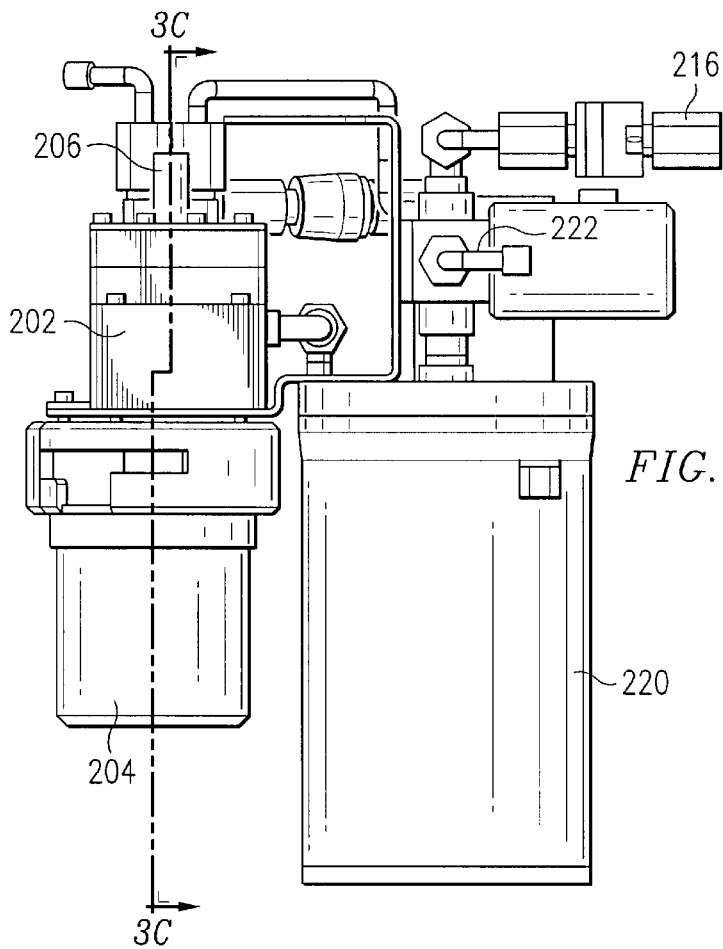
FIG. 3B is an elevation view from the side of the liquid dispensing system of FIG. 3A.
Figure 3C:
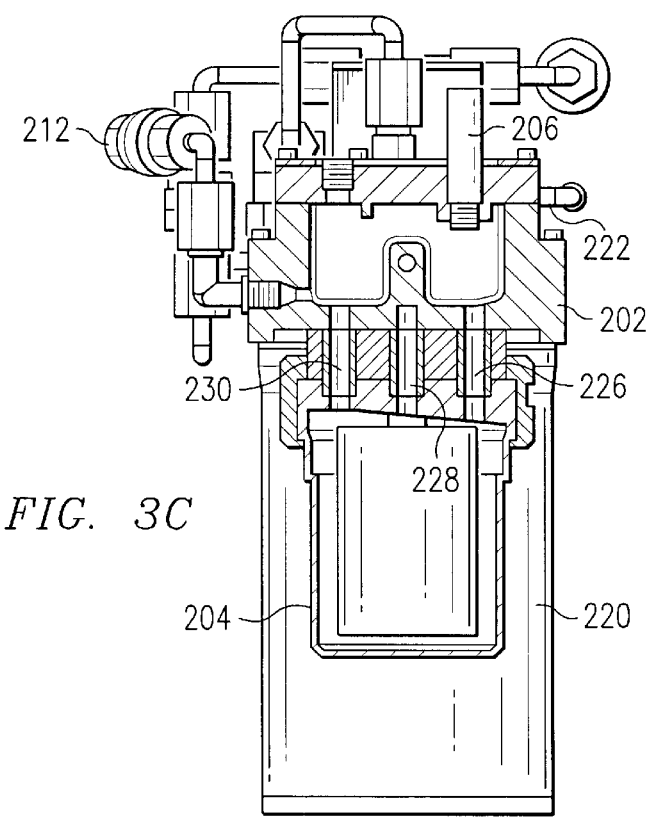
FIG. 3C is a sectional view taken along section 1—1 of the liquid dispensing system of FIG. 3B.

Referring to FIG. 2 and FIGS. 3A–3C, a representative example of pumping system referenced in connection with FIG. 1, with which the invention may be used is shown. FIG. 2 is a schematic representation of the pumping system 106 and pneumatic supply or box 108. FIGS. 3A–3C shows, as an representative example only, a particular physical implementation or embodiment of the pumping system 106. Though the particular physical form shown may have advantages over other forms, it is not intended to limit the physical realization of system pumping system 106 to any particular form. Briefly, the illustrated pumping system is representative of one that includes a positive displacement pump. This pump is a mechanism whose movement causes a controlled displacement of a knowable and repeatable quantity of fluid through a nozzle or other structure, which will be used in the fabrication of a semiconductor device or circuit. Fluid from a source is filtered by a filter prior to it entering the dispensing pump. The filter does not receive fluid directly from the source, but rather via a reservoir, to which a vacuum or a pressurizing gas can be applied in connection with a process for facilitating charging of the filter and removal of air from the pumping system. A first stage of a two-state pumping system could act as the reservoir if a two stage pumping system is used. This first stage could be a positive displacement pump, with its pumping chamber acting as a reservoir, or other type of pump, such as one that pressurizes a chamber by a gas. Unless otherwise specifically noted, the reservoir described herein contemplates a chamber capable of holding fluid, whether or not it is being used to pump fluid during dispensing.

In the illustrated embodiment, reservoir 202 is coupled to one or more sources of liquid via an inlet conduit or line 210. As used herein, line and conduit are intended to refer to any means for transporting liquid or gas, including tubes, pipes, passages, channels and the like. The source of the liquid can be, for example, a bulk container or bottle in which the liquid chemicals is transported and/or stored prior to dispensing. If more than one source container is used, a source switching system, which permits the selection of the source container or bottle, may be employed. Check valve 212, located between reservoir 202 and the source, prevents back flow of liquid from the reservoir to the source. Reservoir 202 includes a liquid level sensor 206. Liquid level sensor 206 senses the level of the liquid in reservoir 202 that provides information on the liquid level—in particular whether the liquid level is at a set or known level—that is used by controller 102. This information is, in the exemplary embodiment, communicated to controller 102 by an electrical signal connected through pneumatic box 108 but could be communicated by any other suitable means. Filter 204 receives fluid from reservoir 202 via an inlet conduit 226. The filter includes a chamber, formed by a housing, in which filtering media is placed. Because of the high purity environment in which the dispensing system in intended to be used, the filtering media should be replaced regularly. Therefore, it is preferable to be able to disassemble the filter housing to replace the filter. In the illustrated embodiment, part of the filter housing is attached to or integrated with the reservoir's housing, and the integrated reservoir and filter assembly is hung on the housing for pump 220 by means of a bracket. However, the filter housing and/or reservoir housing could also be integrated with the structure of pump 220. Also, part of the filter's replaceable filter media could form part of the filter's housing.

Filtered liquid from filter 204 is drawn out of the filter and into pump 220 by operation of the pump. The liquid is physically transferred to the pump by means of outlet tube 228. A check valve 214 prevents the flow back into the filter of fluid previously drawn out of the filter by the pump. Pump 220 is a positive displacement pump that is used to dispense chemicals for a high purity fabrication process, such as those used to fabricate semiconductors. As such, it is typically a high precision, high purity pump that has a relatively small volumetric displacement. The pump includes, or has associated with it, three-way valve 218 for controlling the flow of liquid into and out of the pump. Two, two-way valves or other valve combinations could be used to implement the three-way valve, and no particular physical configuration is intended to be implied. The valve is preferably solenoid-controlled. The outlet of the pump is carried toward a dispense station by means of dispense line 222. Liquid from filter 204 may be drained, such as prior to changing the filter, via drain conduit 224. The drain conduit may, at the option of the user, empty into a liquid source bottle, container or system, or may be discarded. Check valve 216 prevents the pump from drawing in fluid from the drain.

The filter is vented into reservoir 202 by means of conduit 230 that extends from the top of the filter housing and opens into the reservoir. An exit opening of the conduit is preferably below the normal liquid level of the reservoir. A pressurizing gas, such as an inert gas like nitrogen, and a vacuum may be each applied to the reservoir through controllable valves. The vacuum line to the reservoir also acts as a vent line for the pumping system. A solenoid controlled valve 208 opens and closes the vacuum line.

In the exemplary embodiment, control of the supply of the pressuring gas is taken care of by pneumatic box 108. However, it could also be supplied directly from a source of pressurizing gas through a controllable valve associated directly with the pumping system. Similarly, the vacuum is generated by means of Venturi located in pneumatic box 108, but could be supplied by a Venturi located elsewhere. The Venturi is preferred because, as compared to a vacuum pump, it will withdraw air from the reservoir and, by means of vent line 230, from the filter much more quickly.

The pneumatic supply or box 108 is preferred in situations intended to support multiple pumping systems, and therefore includes a plurality of pressurized gas outlets and vacuum outlets. Generally, it is preferable to control separately the supply of pressurizing gas and vacuum to each pumping system. Therefore, there is one pressure and one vacuum outlet for each pumping system. Each pressurized gas outlet is controlled by means of a pneumatically-controlled valve 244. The pneumatic box includes a connector 254 for receiving gas from a source, such as a bottle or distribution system. The pressure of the gas that is supplied to pumping systems is regulated by pressure regulator 250. It is then filtered by filter 248 prior to flowing to valves 244. Each valve 244 is pneumatically actuated by the pressuring gas. Solenoid controlled valves 246 control the application of the gas for actuation. For each vacuum outlet, there is a vacuum Venturi 234. Each Venturi relies on the inert pressuring gas to generate a vacuum. The pressure of the gas, prior to it flowing into the Venturi, is regulated by a pressure regulator 236. A solenoid controlled valve 240 turns on and off the flow of gas through each Venturi. The pressurized gas used to generate the vacuum, as well as any air vented from the pumping system 106, is discharged through exhaust line 238. Pressure switch 256 is used to monitor the pressure of the gas coming from the source to ensure that it remains within an acceptable range. The pneumatic supply or box may also be used to supply pressuring gas for using in liquid supply bottle switching systems (not shown) for each pumping system. A plurality of solenoid-controlled valves 258 control the connection of the pressurized gas to a plurality of outlets, each of which may be connected to a different switching system. The bottle switching valves are controlled by controller 102. In the preferred embodiment, if the bottle switching feature is enabled and reservoir 202 does not fill in a predetermined interval of time, controller 102 assumes that the supply bottle is empty and switches the source to another bottle.

Since there is no filter in the dispense path of the positive displacement pump, overall filtration of the liquid dispensed from the pump may not be as good as if the filter was located in the dispense path of the pump as impurities or contaminants in the components of the dispensing system following the filter, for example, the pump, may cause contamination of the dispensed liquid. This problem can be overcome, for example, by using components that are less contaminated.

Briefly, the system operates as follows. When filter media is to be changed, dispensing stops. The reservoir is pressured with pressuring gas, which causes the liquid in the filter to be purged through the drain line 224. When the filter and the reservoir are purged of liquid, the filter is opened and the media replaced. A vacuum is then applied to the reservoir by opening valve 208. This vacuum causes air to be drawn out of the reservoir 202 and out of filter 204 through vent 230. It also causes liquid to be drawn into reservoir from the source and to start filling the reservoir and, at the same time, filter through inlet 226. While the reservoir and filter are filling, air will continue to be vented from the filter into the reservoir and then through the vacuum/vent line 242. Pump 220 need not operate, but it could. The vacuum supplied on line 242 is considerably more effective than the vacuum that is generated by the pump 220. Once liquid in the reservoir reaches a predetermined level, liquid level sensor 206 indicates to the controller to stop the vacuum by shutting valve 240 and turning off the associated Venturi. The vent valve will stay turned on for additional, short, programmed time to equalize the pressure or relieve the vacuum in the reservoir. Otherwise, reservoir might be overfilled. The system is then ready for dispensing.

Figure 4:
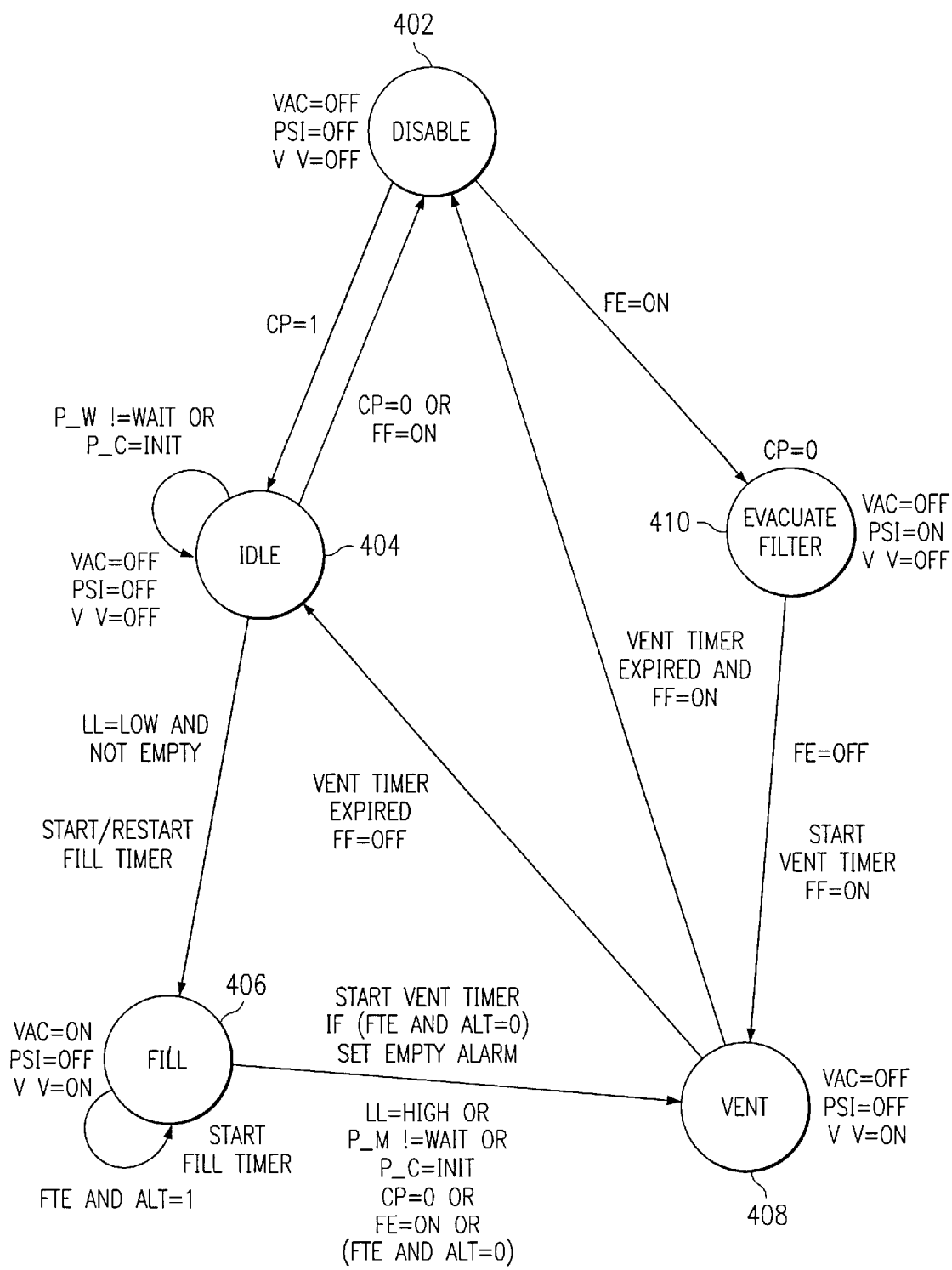
FIG. 4 is a state transition diagram for the preferred embodiment liquid dispensing system.

Referring to FIG. 4, with further reference to FIG. 2, a state transition diagram 400 illustrates certain processes and states of the dispensing system 100. The controller relies on a state machine model to control operation of the system. However, the controller need not be implemented as a state machine.

System 100 starts in a "disable" state 402. In the disabled state, vent valve 208, pressure valve 244 and vacuum valve 240 are turned off. Filter 204 may be changed in this state. In the disabled state, two flags are monitored: create pressure flag (CP) flag and a filter evacuation command flag (FE flag). The CP flag is set when a user starts the pneumatic box or system by means of a user command entered through user interface (not shown). The filter evacuation flag is set by a user command entered through a user interface (not shown).

When CP flag is on, which is indicated by the value "1," the system 100 leaves the disable state and enters "idle" state 404. In the idle state, vent valve 208, pressure valve 244 and vacuum valve 240 are turned off. In a preferred embodiment, the state of pump 220 takes priority over the CP and FE flags. The system remains in the idle state while the pump 220 is operating, but it may leave this state if the pump is initializing or enters a waiting state, such as between dispense cycles. If the FE flag turns on, such as when a user wants to evacuate the filter to change it, or the CP flag is turned off while in the idle state, the controller will return to the disable state.

When liquid level sensor 206 senses that the liquid level in reservoir 202 is low but not empty, controller 102 causes system 100 to go into fill state 406. If desired, a fill timer may be started to track the time it takes to fill the reservoir. If the reservoir is not filled within a predefined time, the control can instruct a source switching system to change bottles and restart the timer. If no alternate bottle is available and the fill timer expires without reaching a fill level, an alarm flag is set before the controller moves to "vent" state 408.

In fill state 406, controller 102 turns on vent solenoid 208, vacuum solenoid 240 and vacuum Venturi 234 thereby reducing the pressure in the reservoir. The reduced pressure in the reservoir causes the liquid from the source to enter reservoir 202 via inlet tube 210. The liquid from reservoir 202 flows to filter 204 preferably via conduit 226. Any air in filter 204 is evacuated through vent conduit 230 into reservoir 202. Air in reservoir 202 is evacuated through vent valve 208 and line 232 into the associated Venturi 234, and then expelled through exhaust outlet 238. Evacuating of air from the filter speeds the filling or charging of the filter 204 and the purging of air from the system. As compared to using only a positive displacement pump to fill a filter and evacuate air from the dispense system, use of the vacuum assisted filling results in a substantial decrease in the time it takes to get a pumping system back on line after a filter change, from approximately 60 minutes in one prior art system to approximately 15 minutes for the same system employing dispense system 100.

System 100 goes from fill state 406 to vent state 408 when one or more of the following criteria is satisfied: i) liquid level in reservoir 202 is high or at a desired level; ii) pump mode (PM) is not set to wait; iii) a pump initialize command is issued and CP flag is set to disabled state; iv) a filter evacuation command is issued (FE=ON); or v) fill timer expires and an alternate source bottle is not available. If the fill timer expires and an alternate source bottle is not available an alarm is set to alert the user.

In vent state 408 the solenoid for vacuum valve 240 is in the OFF state and thus the vacuum valve 240 is closed and vacuum Venturi is in the OFF state, pressure valve 244 is closed and the solenoid that controls vent valve 208 is ON and thus the valve is open. In the vent state pressure is relieved from inside the reservoir and the reservoir is brought to a stabilized state. Thus, when the system comes to vent state 408 from fill state 406, the solenoids for vacuum valve 240 and vacuum Venturi 234 are first turned off. The pressure in the reservoir rises and the vacuum drops, thereby reducing and/or completely stopping the flow of liquid from the source into reservoir 202.

On the other hand, when the system comes to vent state 408 from evacuate filter state 410, the solenoid for vent valve 208 is turned ON to allow excess pressure from the system to vent through exhaust outlet 238. Also, pressure valve 244 is turned OFF so that no more pressure is applied to the system via the supply of pressurized gas 254.

Upon the expiration of the vent timer, the system may be sent either to the idle state 404 or to the disable state 402. A filter flag (FF) is utilized in vent state 408 to determine whether the system should go to the idle state 404 or to the disable state 402. The FF flag indicates that the vent state was entered through evacuate filter state 410, which is the state that is entered for changing filter media. If it is off, the filter is being changed or is not present. In general, if the system reaches vent state 408 through fill state 406, it enters the idle state upon the expiration of the vent timer. On the other hand, if the system reaches the vent state 408 through the evacuate filter state 410, then it enters the disable state 402 upon the expiration of the vent timer. If the FF flag is ON, then the system goes to the disable state and if the FF flag is OFF, then the system goes into the idle state.

To change or take out filter media, a user enters a command through the user interface associated with controller 102, that sets the filter evacuation flag (FE) to an ON state. However, the controller will only enter the evacuate filter state from the disable state, therefore the pressure system must also be turned off, resulting in the CP flag being set to 0. In the evacuate filter state reservoir 202 is pressurized to force all liquid from the filter 204 and reservoir 202 through drain line 224. In evacuate filter state 410, the solenoid for vacuum valve 240 is in the OFF state, the solenoid for pressure valve 244 in the ON state, and the solenoid for vent valve 208 in the OFF state, meaning that the vacuum valve 240 and vent valve 208 are closed and the corresponding pressure valve 244 is open. By closing the vent valve 208, pressure created in the reservoir is maintained.

After evacuation of the liquid from the filter and reservoir 100, the FE flag is set to OFF and an FF flag is set to ON thereby indicating that the system reached the Vent state 408 through the Evacuate Filter state 410. The system is moved to vent state 408 to allow the system to vent the pressure that was built up during evacuate filter state 410. A vent timer may be started and the system allowed to vent for a predetermined time. Once the filter is evacuated and vented, controller 102 disables the system by turning the solenoid for vent valve 208 OFF. Filter 204 can then be changed, if desired.

Figure 5:
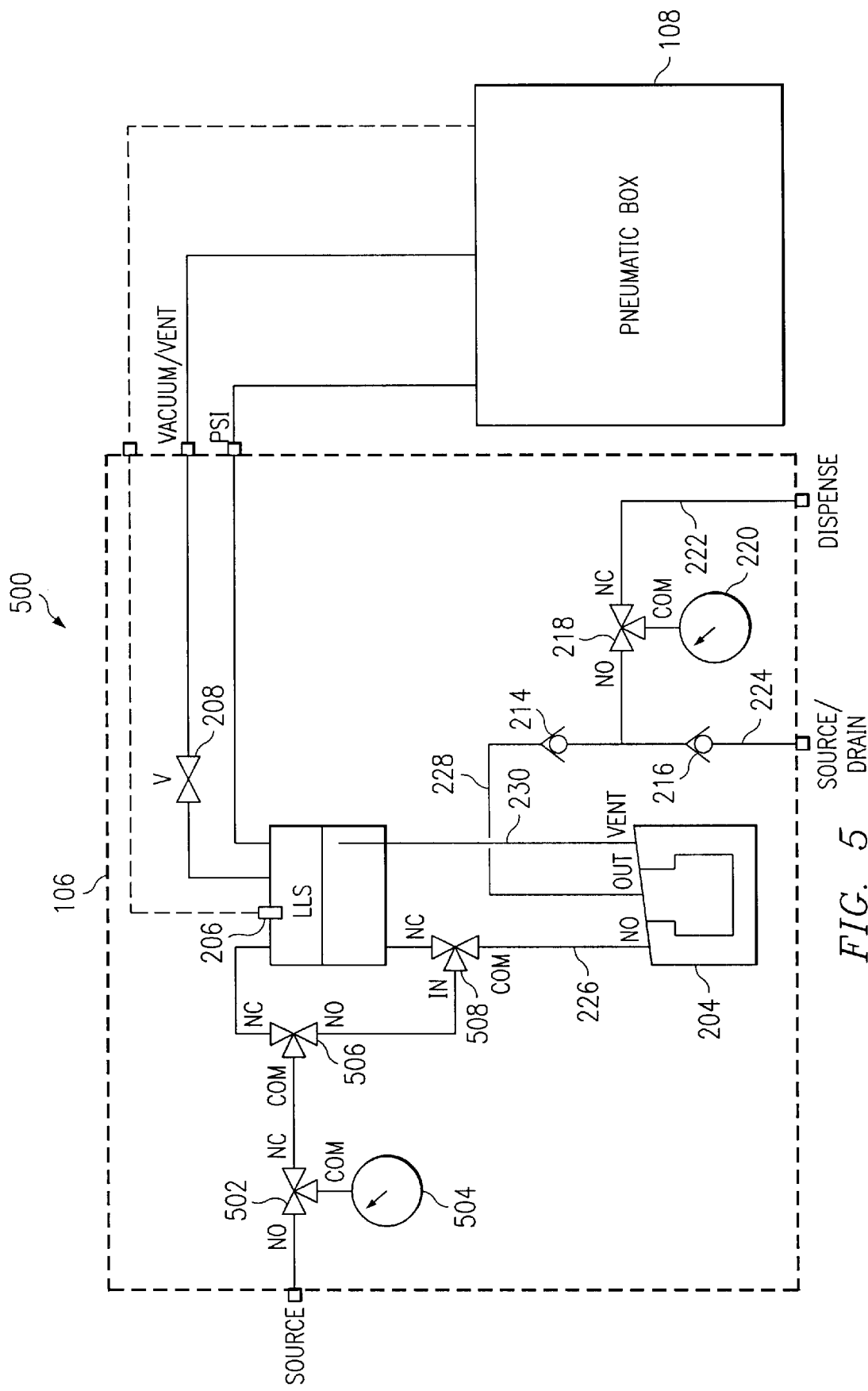
FIG. 5 is an alternate embodiment of a liquid dispensing system incorporating teachings of the present invention.

Referring now to FIG. 5, an alternate, two-stage dispense system 500 is illustrated. In this system, the source is connected through a first stage pump 502, which is illustrated as a positive displacement pump but could be another type of pump. Pump 502 has associated with it three-way valve 504 to control the flow of liquid into and out of the pumps. This valve and the other three-way valves shown herein can be, if desired, physically implemented by two two-way values or any other combination of valves. Reference to a three-way valve does not imply that it is limited to no more than three ways. The outlet of three-way valve 504 is switched by means of another three-way valve 506 between at least reservoir 202 and a third three-way valve 508 disposed between the reservoir's liquid outlet and the inlet of filter 204. This arrangement permits pump 502 to be connected directly to the inlet of the filter during a normal dispensing operations, if desired. In this configuration, the first stage pump is able to reduce, for example, the pressure differential of the liquid across filter. If the filter needs to be charged, such as after changing, the outlet of pump 502 can be switched by valve 506 to the inlet of the reservoir 202, and the inlet of the filter switched by valve 508 to the reservoir. If dead-leg becomes an issue, the reservoir is opened to move the liquid for the desired time duration.

While the invention has been particularly shown and described by the foregoing detailed description, it will be understood by those skilled in the art that various other changes in form and detail may be made without departing from the spirit and scope of the invention.

What is claimed is:

1. A chemical dispensing system for dispersing high purity liquid chemicals, comprising:
   a reservoir for storing liquid;
   a filter, adapted for receiving removable high purity filtering media, for filtering liquid received from the reservoir, the filter and the reservoir being in fluid communication with each other for allowing liquid to flow from the reservoir into the filter and for allowing gases from the filter to flow into the reservoir, said filter being adapted for coupling to a pump for dispensing filtered liquid; and
   a vacuum source for withdrawing upon activation, gases from said reservoir, the vacuum source causing gases from said filter to be drawn into and then out of the reservoir.

2. The chemical dispensing system of claim 1, wherein the reservoir is adapted for coupling to at least one liquid supply source for replenishing liquid in the reservoir.

3. The chemical dispensing system of claim 2, wherein operation of the vacuum source causes gas to be withdrawn from the filter and the reservoir and liquid to fill the reservoir and filter.

4. The chemical dispensing system of claim 1, wherein the reservoir and filter are physically arranged for liquid to flow into the filter from the reservoir under force of gravity.

5. The chemical dispensing system of claim 1, further comprising a liquid level sensor in said reservoir.

6. The chemical dispensing system of claim 5, further comprising a controller operable to activate a vacuum source in response to the liquid level sensor indicating a low liquid level.

7. The chemical dispensing system of claim 6, wherein the controller is operable to deactivate the vacuum source in response to the liquid level sensor indicating a high liquid level.

8. The chemical dispensing system of claim 1, further comprising a controller operable to activate a pressure source for applying pressure to liquid in the reservoir, thereby causing liquid in the reservoir and the filter to be purged.

9. The chemical dispensing system of claim 1, further comprising a controller operable to open a vent for reducing pressure within the reservoir.

10. The chemical dispensing system of claim 1, further comprising a pump coupled with the filter for receiving filtered fluid and moving it toward a dispensed point.

11. The chemical dispensing system of claim 10, wherein the pump is a positive displacement pump.

12. The chemical dispensing system of claim 1, wherein the reservoir includes a pumping chamber of a pump other than the pump for dispensing filtered liquid.

13. In a dispensing system for dispensing high purity chemicals, the dispensing systems having a reservoir in fluid communication with a filter, and a pump in fluid communication with the filter for pumping filtered liquid to a dispense point, a method of charging the filter with chemicals comprising evacuating gas from the reservoir, wherein the reservoir and the filter are coupled in a manner for allowing fluid to flow from the reservoir into the filter, and gas to flow from the filter into the reservoir, the evacuation of the reservoir thereby causing gases from the filter to flow into said reservoir as liquid is flowing from the reservoir into the filter.

14. The method of claim 13, further comprising filling the reservoir with liquid during the evacuation of the reservoir.

15. The method of claim 14, wherein the evacuation of the reservoir causes liquid to be drawn into the reservoir from a liquid source.

16. The method of claim 13, further comprising:
receiving a low level indication communicated from a liquid level sensor in said reservoir that the level of liquid in said reservoir has reached a low level; and
activating, in response to receiving the low level indication a vacuum source coupled to said reservoir for evacuating the reservoir, the evacuation of the reservoir causing liquid from a liquid source to be drawn into the reservoir.

17. The method of claim 16 further comprising:
receiving a high level indication from said liquid level sensor that the level of liquid in the reservoir has reached a high level; and
deactivating the vacuum source in response to receiving the high level indication.

18. The method of claim 13, further comprising purging the filter by applying force to liquid in the reservoir, thereby causing liquid from the reservoir to flow into the filter and liquid in the filter to flow out of the liquid dispensing system via an outlet in the filter.

19. A system for dispensing liquid, comprising:
a reservoir for storing liquid received from a source through a first line;
a filter having removable high purity filtering media for filtering liquid received from the reservoir through a second line coupling the reservoir and said filter;
a pump for dispensing filtered liquid received from the filter; and
a vacuum source coupled with the reservoir and operable, when activated, for withdrawing gas from the reservoir and from the filter through the second line.

20. The system of claim 19, further comprising a liquid level sensor for monitoring the level of liquid in said reservoir, wherein said liquid level sensor communicates a low level indication to a controller when the level of liquid in the reservoir reaches a low level.

21. The system of claim 20 wherein the controller activates the vacuum source upon receiving the low level indicator, the vacuum source causing liquid to be drawn into the reservoir a liquid supply source.

22. The system of claim 18, further comprising a check valve coupled to the filter for allowing one-way flow of liquid from the filter to the pump.

23. The system of claim 22, wherein the pump includes a positive displacement pump.

24. The system of claim 18 further comprising a pressure source for applying pressure to fluid in the reservoir for forcing the fluid from the reservoir, into the filter, and out of the filter through a drain in order to purge the system of liquid.

* * * * *